(12) United States Patent
Naveh

(10) Patent No.: US 10,134,162 B2
(45) Date of Patent: Nov. 20, 2018

(54) PROCESSING COMBINING-CHARACTER SEQUENCES

(71) Applicant: Facebook, Inc., Menlo Park, CA (US)

(72) Inventor: Barak R. Naveh, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/233,692

(22) Filed: Aug. 10, 2016

(65) Prior Publication Data

US 2016/0350956 A1    Dec. 1, 2016

Related U.S. Application Data

(63) Continuation of application No. 13/632,888, filed on Oct. 1, 2012, now Pat. No. 9,437,019.

(51) Int. Cl.
| | |
|---|---|
| *G06T 11/20* | (2006.01) |
| *G06T 11/60* | (2006.01) |
| *G06F 17/21* | (2006.01) |
| *G06F 17/22* | (2006.01) |

(52) U.S. Cl.
CPC ............ *G06T 11/60* (2013.01); *G06F 17/214* (2013.01); *G06F 17/2217* (2013.01); *G06T 11/20* (2013.01); *G06F 17/2235* (2013.01); *G06F 17/2247* (2013.01)

(58) Field of Classification Search
CPC ........ G06T 11/60; G06T 11/20; G06T 11/001; G06F 17/214; G06F 17/2217; G06F 17/2235; G06F 17/2247; G06F 17/21; G06F 17/22; G06F 17/2785; G06F 3/0482; G06F 17/2765; G06N 3/08; G06N 3/006; G06K 9/18; G06K 9/4604; G06K 2209/01; H04L 51/32; H04L 63/123

See application file for complete search history.

(56) References Cited

U.S. PATENT DOCUMENTS

| | | | |
|---|---|---|---|
| 6,038,575 A * | 3/2000 | Jensen | G06F 3/1454 345/467 |
| 6,438,516 B1 * | 8/2002 | Davis | G06F 17/2217 345/467 |
| 2002/0120654 A1 * | 8/2002 | Xu | G06F 17/2217 715/264 |

(Continued)

*Primary Examiner* — Xilin Guo
(74) *Attorney, Agent, or Firm* — Baker Botts L.L.P.

(57) ABSTRACT

Particular embodiments of a computing device receive an indication of a character encoding system and a combining-character sequence. The character encoding system may comprise one or more ranges of character elements. The combining-character sequence may comprise two or more character elements. The two or more character elements may comprise at least one base letter and one or more combining marks. A mapping code may be determined for the combining-character sequence. If no mapping code exists, a next-available mapping code may be determined, and the combining-character sequence may be stored in association with the next-available mapping code in a data store on the computing device. A corresponding glyph may be determined based on the mapping code—if no glyph exists, the glyph may be generated or retrieved from a server and stored in association with the mapping code in the data store. Information may be provided to display the glyph.

20 Claims, 6 Drawing Sheets

(56) References Cited

U.S. PATENT DOCUMENTS

| | | | |
|---|---|---|---|
| 2004/0176944 A1* | 9/2004 | Noda | G06F 17/2217 704/3 |
| 2009/0187634 A1* | 7/2009 | Colon | H04L 12/581 709/206 |
| 2013/0127872 A1* | 5/2013 | Kaplan | G06T 11/203 345/467 |
| 2013/0227011 A1* | 8/2013 | Sharma | G06Q 50/01 709/204 |

* cited by examiner

PROCESSING COMBINING-CHARACTER SEQUENCES

PRIORITY

This application is a continuation under 35 U.S.C. § 120 of U.S. patent application Ser. No. 13/632,888, filed 1 Oct. 2012, which is incorporated herein by reference.

TECHNICAL FIELD

This disclosure generally relates to displaying text on client devices, in particular, processing combining-character sequences for display on client devices.

BACKGROUND

Web browsers and other software applications may rely upon character-encoding standards in order to ensure that most, if not all, characters, including combining-character sequence-based characters such as ü, â, Ħ, Ş [Ş]Ş̈ŞŞ [Ş]Ş̈Aḧü, and ô are predictably rendered across different client devices, which may have different versions of the browser or other software application running on top of different operating systems, which are themselves executing on different hardware configurations. One such character-encoding standard is Unicode. "The Unicode® Standard: A Technical Introduction" provides a concise introduction to Unicode, as shown in the following excerpt (see http://www.unicode.org/standard/principles.html):

The Unicode Standard is the universal character-encoding standard used for representation of text for computer processing. The Unicode Standard defines codes for characters used in all the major languages written today. Scripts include the European alphabetic scripts, Middle Eastern right-to-left scripts, and many scripts of Asia. The Unicode Standard further includes punctuation marks, diacritics, mathematical symbols, technical symbols, arrows, dingbats, emoji, etc. It provides codes for diacritics, which are modifying character marks such as the tilde (), that are used in conjunction with base characters to represent accented letters (ñ, for example). In all, the Unicode Standard, Version 6.0 provides codes for 109,449 characters from the world's alphabets, ideograph sets, and symbol collections.

The majority of common-use characters fit into the first 64K code points, an area of the codespace that is called the basic multilingual plane ("BMP"). There are sixteen other supplementary planes available for encoding other characters, with currently over 860,000 unused code points. More characters are under consideration for addition to future versions of the standard. The Unicode Standard also reserves code points for private use. Vendors or end users can assign these internally for their own characters and symbols, or use them with specialized fonts. There are 6,400 private use code points on the BMP and another 131,068 supplementary private use code points, should 6,400 be insufficient for particular applications.

Text elements are encoded as sequences of one or more characters. Certain of these sequences are called combining character sequences, made up of a base letter and one or more combining marks, which are rendered around the base letter (above it, below it, etc.). For example, a sequence of "a" followed by a combining circumflex """ would be rendered as "â". Certain sequences of characters can also be represented as a single character, called a precomposed character (or composite or decomposible character). For example, the character "ü" can be encoded as the single code point U+00FC "ü" or as the base character U+0075 "u" followed by the non-spacing character U+0308 "". The Unicode Standard encodes precomposed characters for compatibility with established standards such as Latin 1, which includes many precomposed characters such as "ü" and "ñ".

A single number is assigned to each code element defined by the Unicode Standard. Each of these numbers is called a code point and, when referred to in text, is listed in hexadecimal form following the prefix "U+". For example, the code point U+0041 is the hexadecimal number 0041 (equal to the decimal number 65). It represents the character "A" in the Unicode Standard. As discussed above, a range of code points on the BMP and two very large ranges in the supplementary planes are reserved as private use areas. These code points have no universal meaning, and may be used for characters specific to a program or by a group of users for their own purposes. For example, a group of choreographers may design a set of characters for dance notation and encode the characters using code points in user space. A set of page-layout programs may use the same code points as control codes to position text on the page. The main point of user space is that the Unicode Standard assigns no meaning to these code points, and reserves them as user space, promising never to assign them meaning in the future. (end of excerpt)

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users. The social-networking system may transmit over one or more networks content or messages related to its services to a mobile or other computing device of a user. A user may also install software applications on a mobile or other computing device of the user for accessing a user profile of the user and other data within the social-networking system.

SUMMARY OF PARTICULAR EMBODIMENTS

Particular embodiments of a client device maintain a data store of mapping codes (e.g., Unicode code points in the range(s) reserved for private use) that correspond to particular combining-character sequences used by a particular user associated with the client device. In particular embodiments, when there is a need for a glyph corresponding to a new combining-character sequence that does not already exist as a pre-composed glyph and that does not already exist in the mapping table, a new listing may be created in the mapping table that correlates a new mapping code to the new combining-character sequence. The client-side software may also request (from a server-side data store) a rendered version of the glyph corresponding to the combining-character sequence and stores the glyph on the client device. In particular embodiments, the mapping table may be stored in session space in a cache and may be refreshed/cleared on a per user session basis. In particular embodiments, the client-side software may maintain certain frequently-used mapping codes in a persistent data store on the client device.

DESCRIPTION OF PARTICULAR EMBODIMENTS

Figure 1A:
FIGS. 1A-C show examples of combining-character sequences in three different languages.

Particular embodiments of a client device generate mapping codes (e.g., Unicode code points in the range(s) reserved for private use) that correspond to particular combining-character sequences used by a particular user associated with the client device. When there is a need for a glyph corresponding to a new combining-character sequence that does not already exist as a pre-composed glyph and that does not already exist in the mapping table, a new listing may be created in the mapping table that correlates the next-available mapping code to the new combining-character sequence. A new mapping code may be used for each graphical variant of a glyph (e.g., different font sizes, different font typefaces, bold, underline, italic, etc.). The client-side software may also request (from a server) a rendered version of the glyph corresponding to the combining-character sequence and stores the glyph on the client device. Client devices are described in further detail with respect to FIG. 6 and corresponding text in the specification.

In particular embodiments, new mapping codes are associated with combining-character sequences on an as-needed basis for the user of the client device. The mapping table may be stored in session space in a cache and may be refreshed/cleared on a per user session basis. The client-side software may maintain certain frequently-used mapping codes in a persistent data store on the client device. The determination of which combining-character sequences are to be mapped (in the first instance) and/or preserved in the persistent data store may be based on the user's usage history.

In particular embodiments where the user is part of a social-networking system, new mapping codes may also (or alternatively) be associated with combining-character sequences according to social-networking factors (tracked server-side) in relation to usage statistics for: (1) combining-character sequences that are predicted to be popular with users of a social-networking system that have profile characteristics similar to the user's profile (age, gender, location, groups, school, interests), (2) combining-character sequences that are predicted to be popular with users of a social-networking system that are connected to the user in a social graph, (3) combining-character sequences that appear in social-networking content generated by social connections of the user, or (4) combining-character sequences that appear in third-party content associated with the user or social connections of the user. In such embodiments, a server may periodically push out new glyphs to client devices to be added to their mapping tables. In such embodiments, the server may also maintain a multi-dimensional table to track the social factors in relation to usage statistics for combining-character sequences. Social graphs and related social-networking content are described in further detail with respect to FIG. 4 and corresponding text in the specification. Social-networking systems are described in further detail with respect to FIG. 5 and corresponding text in the specification.

Within the context of this disclosure, a "character element" may be a base character element or a combining-character element. A base character element may form a character on its own. A combining-character element does not form a character on its own (in typical use) and usually appears in conjunction with a base character element. A "character" may be comprised of two or more character elements (i.e., at least one base character element and one or more combining-character elements). A "character" may refer to a pre-composed character or a decomposed combining-character sequence. A "glyph" may refer to the final rendered form of a character, including all character elements in a combining-character sequence. A glyph is typically provided in an image file format, such as a bitmap. See Table 1 for a few examples: of characters and their decompositions into character elements:

TABLE 1

| Characters and Character Elements | | |
| --- | --- | --- |
| Character | Base Character Element | Combining-Character Element(s) |
| Ñ | N | ˜ |
| ǔ | u | ˇ |
| æ | æ | |

Figure 1B:
Figure 1C:

FIGS. 1A-C illustrate examples of combining-character sequences in three different languages. Each combining-character sequence comprises two or more character elements. The two or more character elements include at least one base character element (i.e., "letter") and one or more combining-character elements. A combining-character element may be a standalone "letter" or a combining mark. A combining mark may be illustrated in conjunction with a dotted circle diacritic (a placeholder for the base character element) so as to illustrate positioning of the combining mark.

FIG. 1A illustrates an example of a combining-character sequence using Latin character elements. With Latin character elements, a combining-character sequence is typically comprised of a "letter" as a base character element and one or more combining-character elements representing combining marks (i.e., "accents"). In the example shown in FIG. 1A, the base character element "e" is sequentially combined with a character element for a circumflex mark ("^") and a character element for a tilde mark ("˜") to form the resulting glyph (" ").

FIG. 1B illustrates an example of a combining-character sequence using Korean character elements. In Hangul (the writing system for the Korean language), a syllabic block typically comprises a combination of two or more character elements, each character element comprising a consonant, a consonant cluster, a vowel, or a vowel cluster, wherein the combination comprises at least one vowel (or double vowel) character element and at least one consonant (or double consonant) character element. A combining-character sequence may represent a character element, or it may represent the entire syllabic block. In the example shown in FIG. 1B, the double consonant onset character element ("ㄲ") is combined with a diphthong medial character element ("ㅐ") and a final bi-consonantal cluster character element ("ㄿ").

FIG. 1C illustrates an example of a combining-character sequence using Devanagari script character elements in the Hindi language. Devanagari typically has a syllabic structure comprising a combination of two or more character elements, each character element comprising a consonant, a consonant cluster, a vowel, or a vowel cluster, wherein the combination comprises at least one vowel (or double vowel) character element and at least one consonant (or double consonant) character element. A combining-character sequence may represent a character element, or it may represent the entire syllabic block. In the example shown in FIG. 1C, a word comprising two syllabic blocks is shown. The first syllabic block comprises the consonant ("ह"), the vowel (" "), and a diacritic dot mark (anusvara) indicating a nasalization. The second syllabic block comprises the consonant ("द") and the vowel (" ").

The overall set of possible combining-character sequences in any given language may be extremely large; however, the typical number of combining-character sequences typed by any given user is very low (on the order of tens) and rarely exceeds 500 on a per user session basis. Particular embodiments generate mapping codes (e.g., Unicode code points in the range(s) reserved for private use) that correspond to particular combining-character sequences used by a particular user associated with the client device. The steps involved in producing the examples shown in FIGS. 1A-C, are described in further detail in FIG. 2 and related text in the specification.

Figure 2:
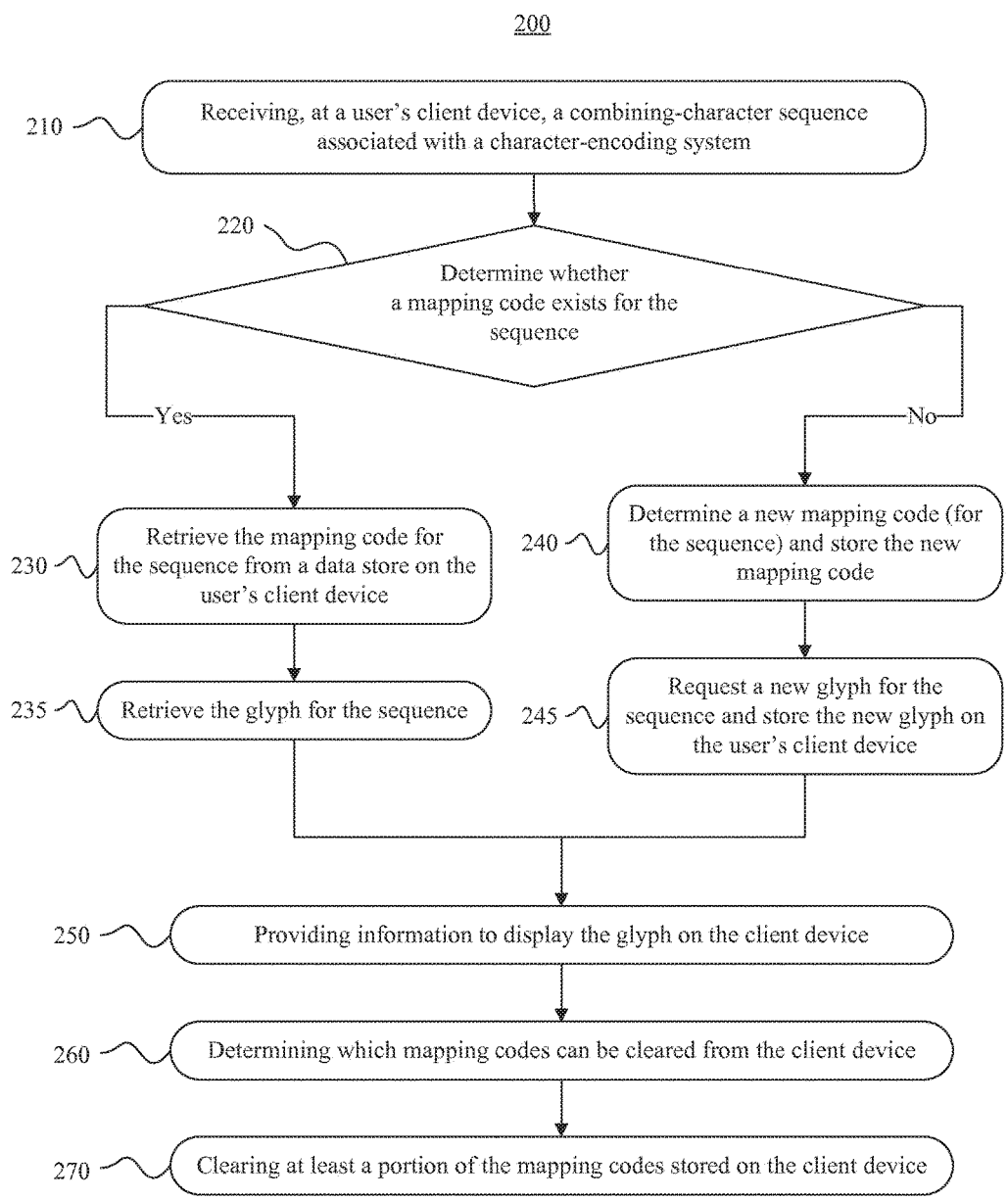
FIG. 2 is a flowchart of an example method according to particular embodiments.

FIG. 2 is a flowchart of an example method for processing combining-character sequences for display on client devices. In step 210, particular embodiments of the user's client device receive one or more combining-character sequences associated with a character-encoding system. In one example, the user may have been using an application on their client device to download a Hindi online newspaper's webpage that includes Devanagari script, wherein the content is encoded using the Unicode character-encoding system. In another example, the user may have been typing in French using a texting application that uses the UTF-8 character-encoding system.

In either case, the client device may receive one or more combining-character sequences for which it needs to render the appropriate characters for display. Each combining-character sequence may comprise two or more character elements. Of the two or more character elements, there are at least one base character element and one or more combining-character character elements, as illustrated by the examples shown in FIGS. 1A-C.

In step 220, for each received combining-character sequence, particular embodiments determine whether a mapping code based on the character-encoding system exists for the combining-character sequence. Table 2 below illustrates an example table storing combining-character sequences associated with mapping codes and corresponding glyphs.

TABLE 2

Mapping Codes

| Combining-character sequence | Mapping Code | Glyph |
|---|---|---|
| e + ̂ + ̃ | U+E0A06 | ẽ̂ |
| ㄲ + ㅖ + ◌ | U+E470F | 꼐 |
| ह + ि + ं + द + ी | U+EFB2 | हिंदी |

In particular embodiments, a separate set of mapping codes may exist for each character-encoding system utilized on the client device. Mapping codes may be stored in a table in cache memory as part of a user session, in a database in persistent storage, or in any other form of data store on the user's device. Types of data stores for a client device are described in further detail with respect to FIG. 6 and corresponding text in the specification. In particular embodiments, where the mapping codes are stored in a database table, the database table may be indexed according to the combining-character sequences.

If a mapping code already exists for the combining-character sequence, in step 230, particular embodiments retrieve the mapping code for the combining-character sequence from the data store on the client device. In step 235, particular embodiments retrieve the glyph for the combining-character sequence based on the mapping code. The glyph may also be stored on the client device.

If a new mapping code needs to be created for the combining-character sequence, in step 240, particular embodiments determine a new mapping code for the combining-character sequence and store the new mapping code in association with the combining-character sequence. In step 245, particular embodiments request a new glyph for the combining-character sequence and store the new glyph on the client device in association with the mapping code. In particular embodiments, the request may be made to a server that renders the new glyph and sends it back to the client device. For example, the client device may send a HTTP request to a server, wherein the request comprises the combining-character sequence, at which point the server composes the corresponding character and generates a rasterized bitmap of the glyph, which is then sent back to the client device. In particular embodiments, software may exist on the client device itself that can compose the character corresponding to the combining-character sequence and generate the glyph. The glyph may be stored in the same data store and/or data structure as the mapping code, or it may be stored in a related data store and/or data structure.

In particular embodiments, the character-encoding system may reserve a range of codes for private use (e.g., the Unicode private use code points), in which case, the next-available code in this private use range may be utilized for the new mapping code.

In particular embodiments, a new mapping code may be used for each graphical variant of a glyph (e.g., different font sizes, different font typefaces, bold, underline, italic, etc.). For example, "á̂" may be stored using a different mapping code than "á̂".

In step 250, particular embodiments provide information to display the glyph on the client device. For example, a bitmap of the glyph may be rendered for display in a manner appropriate to the display capabilities of the client device.

In particular embodiments, where mapping codes for combining-character sequences are stored in a data store on the client device, there may be a need to continually or periodically remove old listings or entirely clear out or refresh the mapping codes. In one example, in embodiments where mapping codes are stored on a per user, per session basis, all mapping codes may be flushed at the end of each user session. In another example, only the most frequently-used mapping codes may be retained in more persistent storage and all others cleared from a cache. In another example, mapping codes may be assigned an expiration date. Any conventional algorithm for determining how to manage the storage of mapping codes may be utilized. If storage space is not an issue, there may be no need to remove old mapping codes and their corresponding glyphs.

In step 260, particular embodiments may determine which stored mapping codes to clear from the client device (e.g., if there is a need to reclaim storage space for other purposes). For example, any mapping code that has not been used in the last month may be deemed no longer useful to retain. In step 270, particular embodiments clear one or more, perhaps all, of the mapping codes (and possibly the corresponding glyphs) from the client device.

In particular embodiments, if the user is part of the social-networking system, the creation and/or maintenance of mapping codes and corresponding glyphs may be based on social-networking factors (assessed by the social-networking system) in relation to usage statistics. When the social-networking system determines that particular users may require new mapping codes to be generated in association with certain new combining-character sequences, the social-networking system may send notifications to the client devices associated with those particular users so that mapping codes can be pre-emptively created for those new combining-character sequences. In addition, if required, a server may generate and push out the corresponding glyphs to those client devices that cannot generate the glyphs on their own. In such embodiments, where mapping codes and glyphs are pre-emptively created and/or stored, management of the client-side data store for such mapping codes and glyphs may become more important.

New mapping codes may be generated in association with combining-character sequences that are (or are predicted to be) popular with users of the social-networking system that have profile characteristics similar to the user's profile (age, gender, location, groups, school, interests). For example, 13-17-year old students who attend public high schools in a particular county may adopt new slang that requires one or more particular combining-character sequences. In another example, 25-40-year-old professionals working in a particular industry may coin a neologism that requires one or more particular combining-character sequences. In this case, glyphs corresponding to those new combining-character sequences may also be pushed out to users who fit the profile of users using those new combining-character sequences, in anticipation that they may also begin using the combining-character sequence soon. New mapping codes may also be generated in association with combining-character sequences often used by users of the social-networking system that are connected to the user in association with a social graph. For example, if a critical mass of the user's first-degree connections have all recently begun using a particular combining-character sequence, the glyph corresponding to that combining-character sequence may also be pushed out to the user.

New mapping codes may also be generated in association with combining-character sequences that appear in social-networking content or other information generated by social connections of the user. For example, if many users having similar interest as the user or belonging to the same group as the user have begun tagging particular types of photos with a new combining-character sequence or posting status updates with the new combining-character sequence, the social-networking system may anticipate that the user may also adopt the new combining-character sequence. New mapping codes may also be generated in association with combining-character sequences that appear in third-party content or other information associated with the user or social connections of the user. For example, if a particular music video published by an entertainment company goes viral, e.g., PSY's "Gangnam Style," or 강남스타일, the social-networking system may then determine that social-networking users who upload, like, or comment on the video may be inclined to start using new combining-character sequences detected in the video.

In particular embodiments, the social-networking system may also maintain a multi-dimensional table to track the various social-networking factors in relation to usage statistics for new combining-character sequences. In particular embodiments, client devices may transmit usage statistics and/or a usage history back to the social-networking system.

Figure 3:
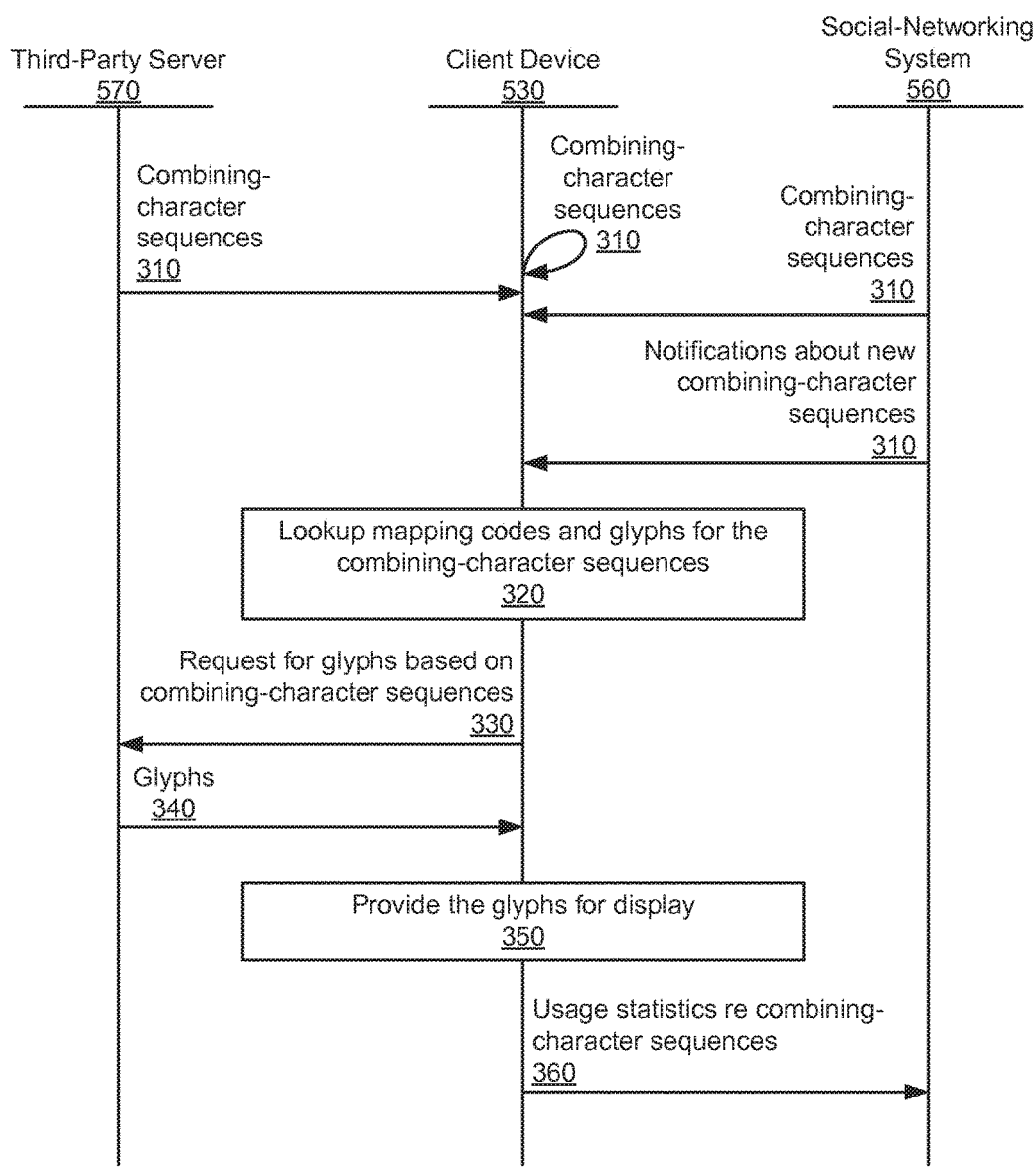
FIG. 3 is an interaction diagram of a process according to particular embodiments.

FIG. 3 is an interaction diagram of a process for processing combining-character sequences for display on client devices. Process interactions may take place between a client device 530, a social-networking system 560 (as described in further detail with respect to FIG. 5), and a third-party server 570.

The client device 530 may receive combining-character sequences 310 from different sources, such as input typed by a user into client computing device 530, content retrieved from a third-party server 570, content retrieved from social-networking system 560, or notifications regarding new combining-character sequences 310 pushed out by social-networking system 560.

The client device 530 may then attempt to look up mapping codes and glyphs for the new combining-character sequences 320. If client device 530 determines that mapping codes does not currently exist for the new combining-character sequences, then client device 530 may create the mapping codes and send a request for corresponding glyphs based on the combining-character sequences 330 to a third-party server 570. (Note for the purposes of this diagram, the third-party server 570 has been depicted as both providing new combining-character sequences and also as providing new glyphs; however, in practice, these two functions may be performed by separate and completely unrelated systems.) Once the client device 530 receives the glyphs 340, it can then provide the glyphs for display 350 (and store them on client device 530).

In particular embodiments, where notifications regarding new combining-character sequences have been pushed out by social-networking system 560, client device 530 may send back usage statistics regarding the the user's use of combining-character sequences 360 to social-networking system 560 in order to facilitate data collection to support the social-networking factors.

Although the embodiments disclosed herein describe the mapping codes as being stored on the client device, in particular embodiments, a set of mapping codes may be maintained on a server, in association with a profile for the user of the client device. In particular embodiments, sets of mapping codes may be determined by a server or on client devices for users in particular locations (e.g., according to the state/country borders), particular self-identified groups of users, users with particular demographic profiles, users associated with particular organizations, etc.

Figure 4:
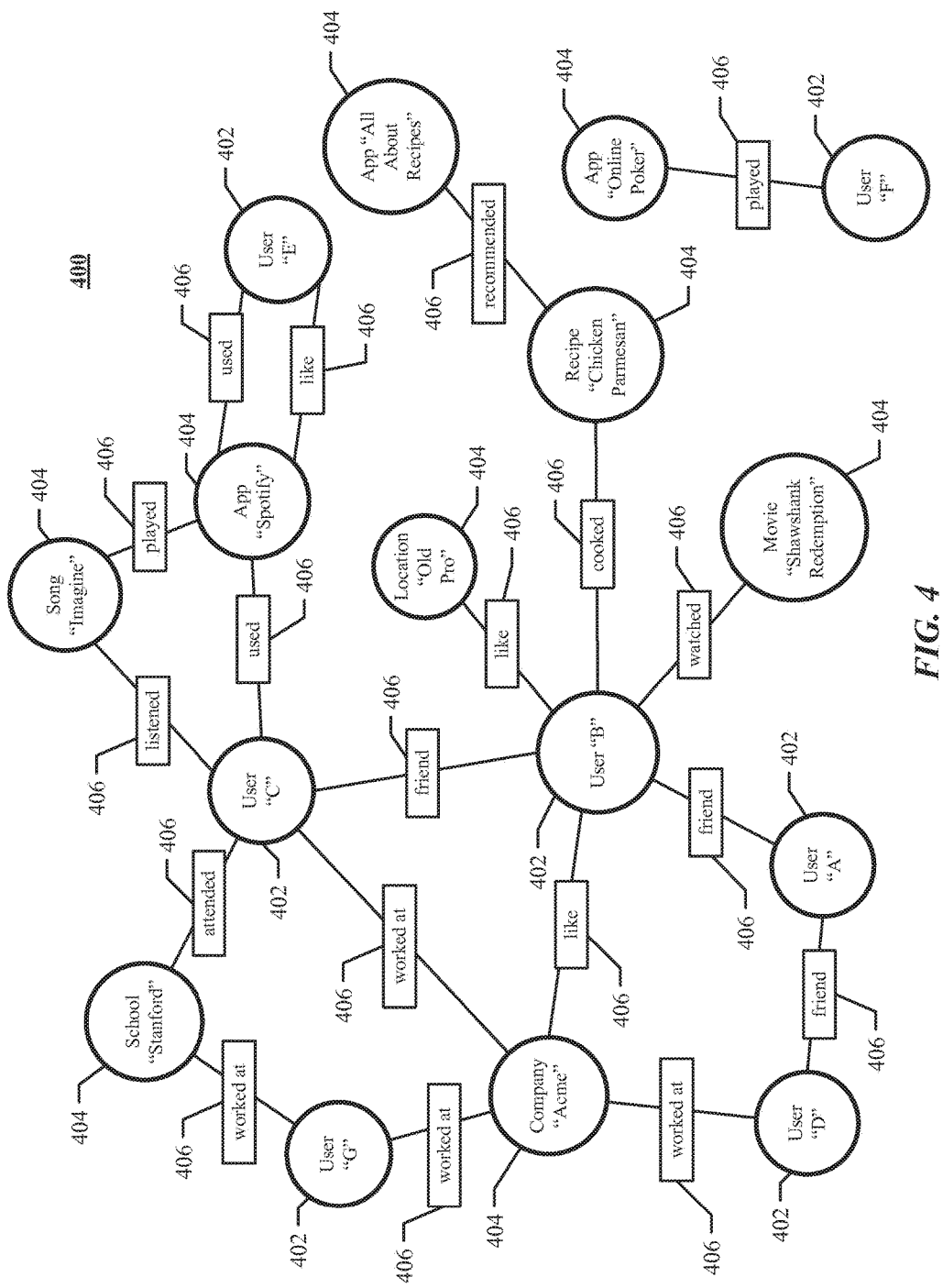
FIG. 4 is a block diagram of an example social graph.

FIG. 4 illustrates example social graph 400. In particular embodiments, social-networking system 560 may store one or more social graphs 400 in one or more data stores. In particular embodiments, social graph 400 may include multiple nodes—which may include multiple user nodes 402 or multiple concept nodes 404—and multiple edges 406 connecting the nodes. Example social graph 400 illustrated in FIG. 4 is shown, for didactic purposes, in a two-dimensional visual map representation. In particular embodiments, a social-networking system 560, client system 530, or third-party system 570 may access social graph 400 and related social-graph information for suitable applications. The nodes and edges of social graph 400 may be stored as data objects, for example, in a data store (such as a social-graph database). Such a data store may include one or more searchable or queryable indexes of nodes or edges of social graph 400.

In particular embodiments, a user node 402 may correspond to a user of social-networking system 560. As an example and not by way of limitation, a user may be an individual (human user), an entity (e.g., an enterprise, business, or third-party application), or a group (e.g., of individuals or entities) that interacts or communicates with or over social-networking system 560. In particular embodiments, when a user registers for an account with social-networking system 560, social-networking system 560 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with social-networking system 560. In particular embodiments, a user node 402 may be associated with information provided by a user or information gathered by various systems, including social-networking system 560. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more webpages or one or more user-profile pages (which may be webpages).

In particular embodiments, a concept node 404 may correspond to a concept. As an example and not by way of limitation, a concept may correspond to a place (such as, for example, a movie theater, restaurant, landmark, or city); a website (such as, for example, a website associated with social-network system 560 or a third-party website associated with a web-application server); an entity (such as, for example, a person, business, group, sports team, or celebrity); a resource (such as, for example, an audio file, video file, digital photo, text file, structured document, or application) which may be located within social-networking system 560 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 404 may be associated with information of a concept provided by a user or information gathered by various systems, including social-networking system 560. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to a webpage.

In particular embodiments, a node in social graph 400 may represent or be represented by a webpage (which may be referred to as a "profile page"). Profile pages may be hosted by or accessible to social-networking system 560. Profile pages may also be hosted on third-party websites associated with a third-party server 570. As an example and not by way of limitation, a profile page corresponding to a particular external webpage may be the particular external webpage and the profile page may correspond to a particular concept node 404. Profile pages may be viewable by all or a selected subset of other users. As an example and not by way of limitation, a user node 402 may have a corresponding user-profile page in which the corresponding user may add content, make declarations, or otherwise express himself or herself. As another example and not by way of limitation, a concept node 404 may have a corresponding concept-profile page in which one or more users may add content, make declarations, or express themselves, particularly in relation to the concept corresponding to concept node 404.

In particular embodiments, a concept node 404 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 530 to transmit to social-networking system 560 a message indicating the user's action. In response to the message, social-networking system 560 may create an edge (e.g., an "eat" edge) between a user node 402 corresponding to the user and a concept node 404 corresponding to the third-party webpage or resource and store edge 406 in one or more data stores.

In particular embodiments, a pair of nodes in social graph 400 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, social-networking system 560 may transmit a "friend request" to the second user. If the second user confirms the "friend request," social-networking system 560 may create an edge 406 connecting the first user's user node 402 to the second user's user node 402 in social graph 400 and store edge 406 as social-graph information in one or more of data stores 24. In the example of FIG. 4, social graph 400 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 400 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to a edge type or subtype. A concept-profile page corresponding to a concept node 404 may include, for example, a selectable "check in" icon (such as, for example, a clickable "check in" icon) or a selectable "add to favorites" icon. Similarly, after a user clicks these icons, social-networking system 560 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 560 may create a "listened" edge 406 and a "used" edge (as illustrated in FIG. 4) between user nodes 402 corresponding to the user and concept nodes 404 corresponding to the song and application to indicate that the user listened to the song and used the application. Moreover, social-networking system 560 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes paritcular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, social-networking system 560 may create an edge 406 between a user node 402 and a concept node 404 in social graph 400. As an example and not by way of limitation, a user viewing a concept-profile page (such as, for example, by using a web browser or a special-purpose application hosted by the user's client system 530) may indicate that he or she likes the concept represented by the concept node 404 by clicking or selecting a "Like" icon, which may cause the user's client system 530 to transmit to social-networking system 560 a message indicating the user's liking of the concept associated with the concept-profile page. In response to the message, social-networking system 560 may create an edge 406 between user node 402 associated with the user and concept node 404, as illustrated by "like" edge 406 between the user and concept node 404. In particular embodiments, social-networking system 560 may store an edge 406 in one or more data stores. In particular embodiments, an edge 406 may be automatically formed by social-networking system 560 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

Figure 5:
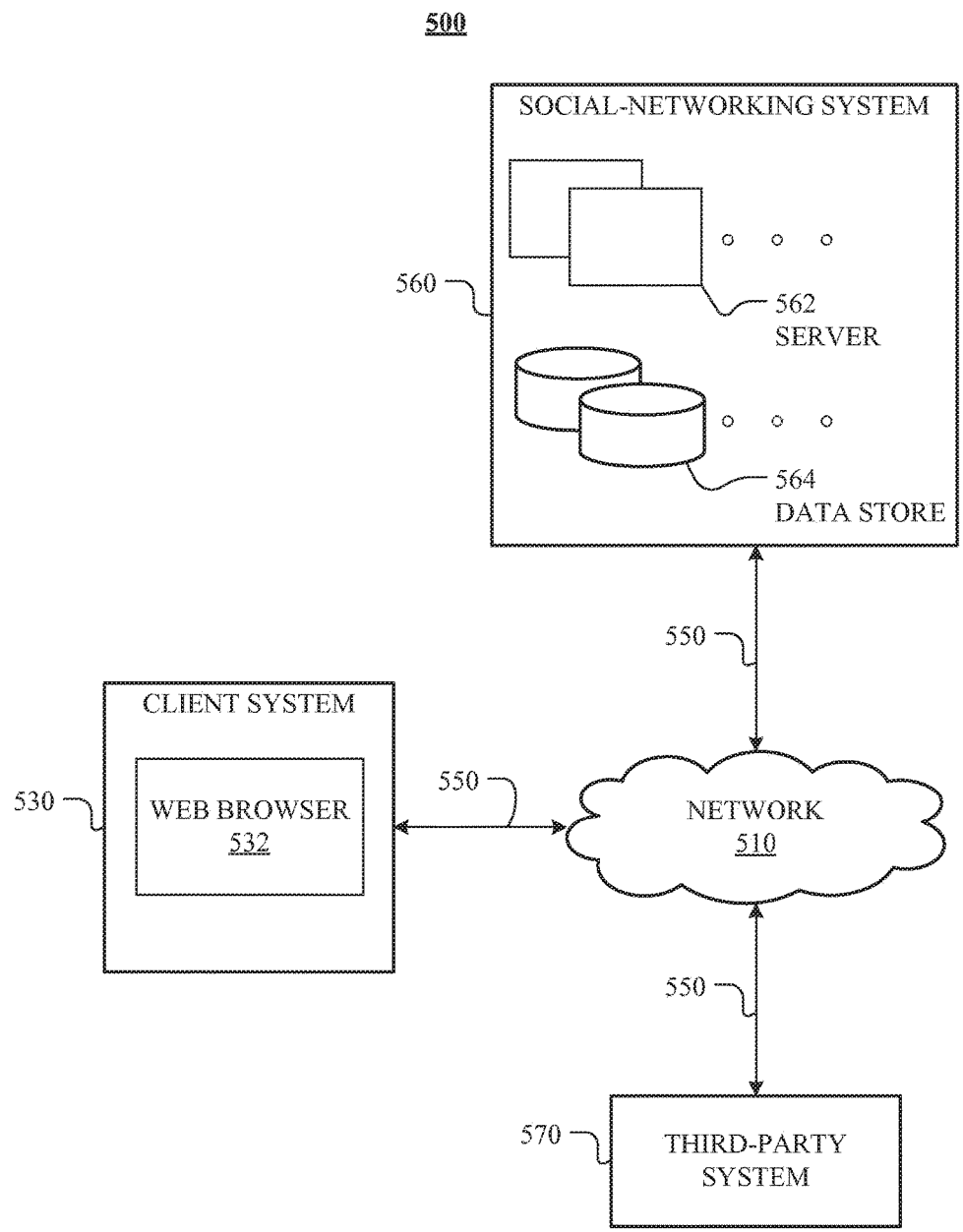
FIG. 5 is a block diagram of an example network environment associated with a social-networking system.

FIG. 5 illustrates an example network environment 500 associated with a social-networking system. Network environment 500 includes a client system 530, a social-networking system 560, and a third-party system 570 connected to each other by a network 510. Although FIG. 5 illustrates a particular arrangement of client system 530, social-networking system 560, third-party system 570, and network 510, this disclosure contemplates any suitable arrangement of client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of client systems 530, social-networking systems 560, third-party systems 570, and networks 510, this disclosure contemplates any suitable number of client systems 530, social-networking systems 560, third-party systems 570, and networks 510. As an example and not by way of limitation, network environment 500 may include multiple client system 530, social-networking systems 560, third-party systems 570, and networks 510.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOC SIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

In particular embodiments, client system 530 may be an electronic device including hardware, software, or embedded logic components or a combination of two or more such components and capable of carrying out the appropriate functionalities implemented or supported by client system 530. As an example and not by way of limitation, a client system 530 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 530. A client system 530 may enable a network user at client system 530 to access network 510. A client system 530 may enable its user to communicate with other users at other client systems 530.

In particular embodiments, client system 530 may include a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 530 may enter a Uniform Resource Locator (URL) or other address directing the web browser 532 to a particular server (such as server 562, or a server associated with a third-party system 570), and the web browser 532 may generate a Hyper Text Transfer Protocol (HTTP) request and communicate the HTTP request to server. The server may accept the HTTP request and communicate to client system 530 one or more Hyper Text Markup Language (HTML) files responsive to the HTTP request. Client system 530 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 560 may be a network-addressable computing system that can host an online social network. Social-networking system 560 may generate, store, receive, and transmit social-networking data, such as, for example, user-profile data, concept-profile data, social-graph information, or other suitable data related to the online social network. Social-networking system 560 may be accessed by the other components of network environment 500 either directly or via network 510. In particular embodiments, social-networking system 560 may include one or more servers 562. Each server 562 may be a unitary server or a distributed server spanning multiple computers or multiple datacenters. Servers 562 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 562 may include hardware, software, or embedded logic components or a combination of two or more such components for carrying out the appropriate functionalities implemented or supported by server 562. In particular embodiments, social-networking system 564 may include one or more data stores 564. Data stores 564 may be used to store various types of information. In particular embodiments, the information stored in data stores 564 may be organized according to specific data structures. In particular embodiments, each data store 564 may be a relational, columnar, correlation, or other suitable database. Although this disclosure describes or illustrates particular types of databases, this disclosure contemplate any suitable types of databases. Particular embodiments may provide interfaces that enable a client system 530, a social-networking system 560, or a third-party system 570 to manage, retrieve, modify, add, or delete, the information stored in data store 564.

In particular embodiments, social-networking system 560 may store one or more social graphs in one or more data stores 564. In particular embodiments, a social graph may include multiple nodes—which may include multiple user nodes (each corresponding to a particular user) or multiple concept nodes (each corresponding to a particular concept)—and multiple edges connecting the nodes. Social-networking system 560 may provide users of the online social network the ability to communicate and interact with other users. In particular embodiments, users may join the online social network via social-networking system 560 and then add connections (i.e., relationships) to a number of other users of social-networking system 560 whom they want to be connected to. Herein, the term "friend" may refer to any other user of social-networking system 560 with whom a user has formed a connection, association, or relationship via social-networking system 560.

In particular embodiments, social-networking system 560 may provide users with the ability to take actions on various types of items or objects, supported by social-networking system 560. As an example and not by way of limitation, the items and objects may include groups or social networks to which users of social-networking system 560 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 560 or by an external system of third-party system 570, which is separate from social-networking system 560 and coupled to social-networking system 560 via a network 510.

In particular embodiments, social-networking system 560 may be capable of linking a variety of entities. As an example and not by way of limitation, social-networking system 560 may enable users to interact with each other as well as receive content from third-party systems 570 or other entities, or to allow users to interact with these entities through an application programming interfaces (API) or other communication channels.

In particular embodiments, a third-party system 570 may include one or more types of servers, one or more data stores, one or more interfaces, including but not limited to APIs, one or more web services, one or more content sources, one or more networks, or any other suitable components, e.g., that servers may communicate with. A third-party system 570 may be operated by a different entity from an entity operating social-networking system 560. In particular embodiments, however, social-networking system 560 and third-party systems 570 may operate in conjunction with each other to provide social-networking services to users of social-networking system 560 or third-party systems 570. In this sense, social-networking system 560 may provide a platform, or backbone, which other systems, such as third-party systems 570, may use to provide social-networking services and functionality to users across the Internet.

In particular embodiments, a third-party system 570 may include a third-party content object provider. A third-party content object provider may include one or more sources of content objects, which may be communicated to a client system 530. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 560 also includes user-generated content objects, which may enhance a user's interactions with social-networking system 560. User-generated content may include anything a user can add, upload, send, or "post" to social-networking system 560. As an example and not by way of limitation, a user communicates posts to social-networking system 560 from a client system 530. Posts may include data such as status updates or other textual data, location information, photos, videos, links, music or other similar data or media. Content may also be added to social-networking system 560 by a third-party through a "communication channel," such as a newsfeed or stream.

In particular embodiments, social-networking system 560 may include a variety of servers, sub-systems, programs, modules, logs, and data stores. In particular embodiments, social-networking system 560 may include one or more of the following: a web server, action logger, API-request server, relevance-and-ranking engine, content-object classifier, notification controller, action log, third-party-content-object-exposure log, inference module, authorization/privacy server, search module, ad-targeting module, user-interface module, user-profile store, connection store, third-party content store, or location store. Social-networking system 560 may also include suitable components such as network interfaces, security mechanisms, load balancers, failover servers, management-and-network-operations consoles, other suitable components, or any suitable combination thereof. In particular embodiments, social-networking system 560 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 560 to one or more client systems 530 or one or more third-party system 570 via network 510. The web server may include a mail server or other messaging functionality for receiving and routing messages between social-networking system 560 and one or more client systems 530. An API-request server may allow a third-party system 570 to access information from social-networking system 560 by calling one or more APIs. An action logger may be used to receive communications from a web server about a user's actions on or off social-networking system 560. In conjunction with the action log, a third-party-content-object log may be maintained of user exposures to third-party-content objects. A notification controller may provide information regarding content objects to a client system 530. Information may be pushed to a client system 530 as notifications, or information may be pulled from client system 530 responsive to a request received from client system 530. Authorization servers may be used to enforce one or more privacy settings of the users of social-networking system 560. A privacy setting of a user determines how particular information associated with a user can be shared. The authorization server may allow users to opt in or opt out of having their actions logged by social-networking system 560 or shared with other systems (e.g., third-party system 570), such as, for example, by setting appropriate privacy settings. Third-party-content-object stores may be used to store content objects received from third parties, such as a third-party system 570. Location stores may be used for storing location information received from client systems 530 associated with users. Ad-pricing modules may combine social information, the current time, location information, or other suitable information to provide relevant advertisements, in the form of notifications, to a user.

Example Computing System

Figure 6:
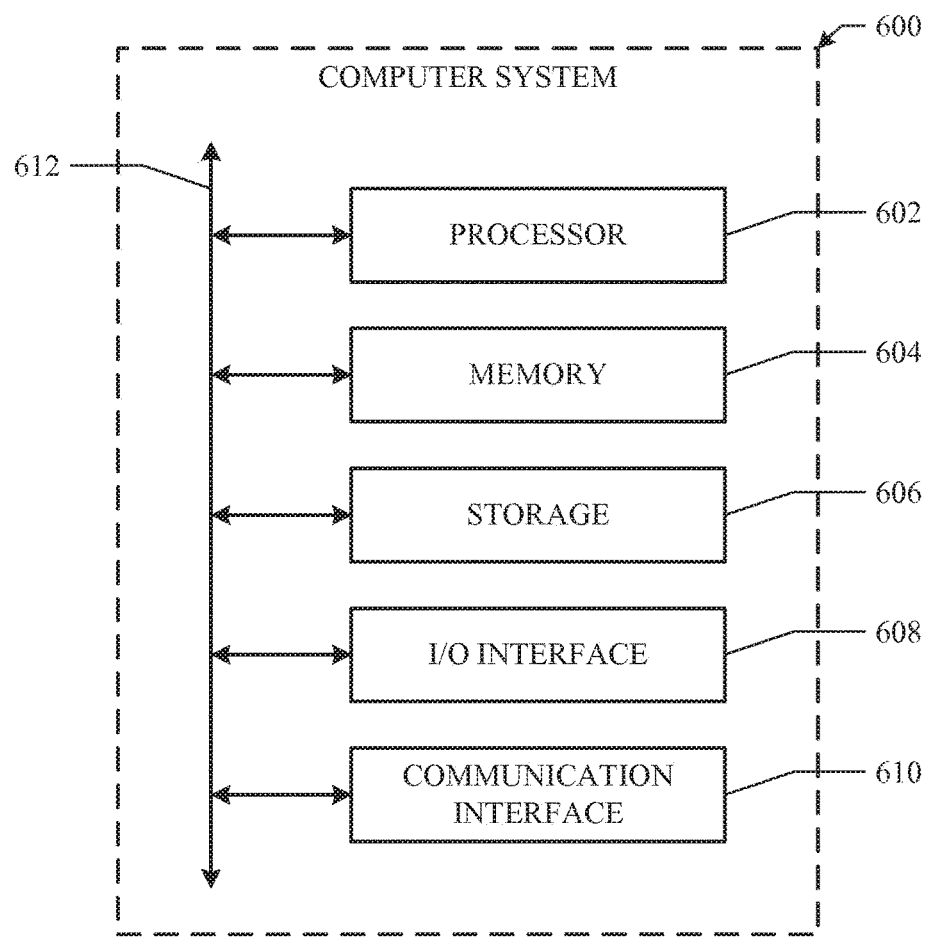
FIG. 6 is a block diagram of an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, another mobile computing device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, I/O interface 608 may include additional hardware, software, or both to support one or more sensors to provide additional information, such as, for example and without limitation: a touch sensor (disposed, for example, on a display of the device, the back of the device and/or one or more lateral edges of the device) for detecting a user touching the surface of the mobile electronic device (e.g., using one or more fingers); an accelerometer for detecting whether the personal computing device 200 is moving and the speed of the movement; a thermometer for measuring the temperature change near the personal computing device 200; a proximity sensor for detecting the proximity of the personal computing device 200 to another object (e.g., a hand, desk, or other object); a light sensor for measuring the ambient light around the personal computing device 200; an imaging sensor (e.g., camera) for capturing digital still images and/or video of objects near the personal computing device 200 (e.g., scenes, people, bar codes, QR codes, etc.); a location sensor (e.g., Global Positioning System (GPS)) for determining the location (e.g., in terms of latitude and longitude) of the mobile electronic device; a sensor for detecting communication networks within close proximity (e.g., near field communication (NFC), Bluetooth, RFID, infrared); a chemical sensor; a biometric sensor for biometrics-based (e.g., fingerprint, palm vein pattern, hand geometry, iris/retina, DNA, face, voice, olfactory, sweat) authentication of a user; etc.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network, or an antenna. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
 accessing a social graph of a first user, the social graph being maintained by an online social-networking system, the social graph comprising a plurality of nodes and a plurality of edges connecting the nodes, wherein:

a first node of the plurality of nodes corresponds to the first user, a plurality of second nodes corresponds to a plurality of second users, wherein each of the plurality of second nodes is connected by an edge of the plurality of edges to the first node; and each edge of the plurality of edges corresponds to a relationship between two nodes of the plurality of nodes;

determining a mapping code associated with a combining-character sequence comprising at least one base character element and at least one combining mark;

determining that a threshold number of the plurality of second users have posted text comprising the combining-character sequence to the online social-networking system;

generating a glyph corresponding to the combining-character sequence, wherein the glyph is stored in association with the new mapping code; and sending the glyph to a client system associated with the first user.

2. The method of claim 1, further comprising:

determining that a threshold number of the second nodes are associated with the combining-character sequence, wherein each of the second nodes are connected by an edge to the first node; and in response to the threshold number of the second nodes being associated with the combining-character sequence, sending the glyph to a client device associated with the first user.

3. The method of claim 1, wherein the mapping code is a Unicode mapping code.

4. The method of claim 1, wherein combining-character sequence appears in a threshold number of posts or comments on the online social network, wherein each of the posts or comments was written by a second user who has a first-degree connection to the first user.

5. The method of claim 1, wherein the combining-character sequence is included in content sent to the computing device, or wherein the combining-character sequence is included in user input entered by a user.

6. The method of claim 1, wherein generating the mapping code comprises:

determining that a mapping code for the combining-character sequence does not exist;

determining a next-available mapping code; and storing the combining-character sequence in association with the next-available mapping code in a data store on the computing device.

7. The method of claim 6, wherein the next-available mapping code is within a range of codes of the character encoding system that are reserved for private use.

8. The method of claim 6, further comprising:

persistently storing one or more mapping codes and their corresponding glyphs based on usage frequency of the one or more mapping codes or available capacity in the data store on the computing device.

9. The method of claim 1, wherein determining the mapping code comprises:

retrieving the mapping code from a data store on a server computing device.

10. The method of claim 1, further comprising:

receiving, from the online social-networking system, information associated with one or more combining-character sequences, the combining-character sequences having been selected based on profile information of one or more users, content or other information generated by one or more users, or third-party content or other information associated with one or more users, wherein the mapping code and glyph are generated based on the received information.

11. The method of claim 1, further comprising:

sending, to a social-networking system, usage information related to one or more combining-character sequences.

12. One or more computer-readable non-transitory storage media embodying software that is operable when executed to:

access a social graph of a first user, the social graph being maintained by an online social-networking system, the social graph comprising a plurality of nodes and a plurality of edges connecting the nodes, wherein:

a first node of the plurality of nodes corresponds to the first user, a plurality of second nodes corresponds to a plurality of second users, wherein each of the plurality of second nodes is connected by an edge of the plurality of edges to the first node; and each edge of the plurality of edges corresponds to a relationship between two nodes of the plurality of nodes;

determine a mapping code associated with a combining-character sequence comprising at least one base character element and at least one combining mark;

determine that a threshold number of the plurality of second users have posted text comprising the combining-character sequence to the online social-networking system;

generate a glyph corresponding to the combining-character sequence, wherein the glyph is stored in association with the new mapping code; and send the glyph to a client system associated with the first user.

13. The media of claim 12, wherein the software is further operable to:

determine that a mapping code for the combining-character sequence does not exist;

determine a next-available mapping code; and store the combining-character sequence in association with the next-available mapping code in a data store on the computing device.

14. The media of claim 13, wherein the next-available mapping code is within a range of codes of the character encoding system that are reserved for private use.

15. A server computer device associated with an online social-networking system, comprising:

one or more processors; and a memory coupled to the processors comprising instructions executable by the processors, the processors operable when executing the instructions to:

access a social graph of a first user, the social graph being maintained by an online social-networking system, the social graph comprising a plurality of nodes and a plurality of edges connecting the nodes, wherein:

a first node of the plurality of nodes corresponds to the first user, a plurality of second nodes corresponds to a plurality of second users, wherein each of the plurality of second nodes is connected by an edge of the plurality of edges to the first node; and each edge of the plurality of edges corresponds to a relationship between two nodes of the plurality of nodes;

determine a mapping code associated with a combining-character sequence comprising at least one base character element and at least one combining mark;

determine that a threshold number of the plurality of second users have posted text comprising the combining-character sequence to the online social-networking system;

generate a glyph corresponding to the combining-character sequence, wherein the glyph is stored in association with the new mapping code; and send the glyph to a client system associated with the first user.

16. The device of claim 15, wherein the processors are further operable to:

determine that a mapping code for the combining-character sequence does not exist;

determine a next-available mapping code; and store the combining-character sequence in association with the next-available mapping code in a data store on the computing device.

17. The device of claim 15, wherein the processors are further operable to:

determine that a threshold number of the second nodes are associated with the combining-character sequence, wherein each of the second nodes are connected by an edge to the first node; and in response to the threshold number of the second nodes being associated with the combining-character sequence, send the glyph to a client device associated with the first user.

18. The device of claim 15, wherein the combining-character sequence appears in a threshold number of posts or comments on the online social network, wherein each of the posts or comments was written by a second user who has a first-degree connection to the first user.

19. The device of claim 15, wherein the combining-character sequence is included in content sent to the computing device, or wherein the combining-character sequence is included in user input entered by a user.

20. The device of claim 15, wherein the processors are further operable to:

receive, from the online social-networking system, information associated with one or more combining-character sequences, the combining-character sequences having been selected based on profile information of one or more users, content or other information generated by one or more users, or third-party content or other information associated with one or more users, wherein the mapping code and glyph are generated based on the received information.

* * * * *